United States Patent [19]
Freeman et al.

[11] Patent Number: 4,751,043
[45] Date of Patent: Jun. 14, 1988

[54] RADIAL NEUTRON REFLECTOR

[75] Inventors: Thomas R. Freeman, Greensburg; Brian H. Alsop, Penn Twp.; Donald G. Sherwood, Monroeville, all of Pa.

[73] Assignee: Westinghouse Electric Corp., Pittsburgh, Pa.

[21] Appl. No.: 912,664

[22] Filed: Sep. 29, 1986

Related U.S. Application Data

[63] Continuation of Ser. No. 576,655, Feb. 3, 1984, abandoned.

[51] Int. Cl.⁴ .............................................. G21C 11/06
[52] U.S. Cl. ..................................... 376/400; 376/458
[58] Field of Search ............... 376/458, 377, 399, 400, 376/389, 390

[56] References Cited

U.S. PATENT DOCUMENTS

| | | | |
|---|---|---|---|
| 2,929,768 | 3/1960 | Mahlmeister et al. | 376/458 X |
| 3,128,234 | 4/1964 | Cage, Jr. et al. | 376/458 X |
| 3,260,650 | 7/1966 | Kalk et al. | 376/458 X |
| 3,682,774 | 8/1972 | Beyer . | |
| 3,893,886 | 7/1975 | Aubert et al. | 376/458 X |
| 4,462,956 | 7/1984 | Boiron et al. | 376/400 X |
| 4,560,531 | 12/1985 | Leroy | 376/400 X |

FOREIGN PATENT DOCUMENTS

| | | |
|---|---|---|
| 39288 | 4/1981 | European Pat. Off. . |
| 59130 | 1/1982 | European Pat. Off. . |
| 60777 | 9/1982 | European Pat. Off. . |
| 1811631 | 11/1968 | Fed. Rep. of Germany . |
| 2063022 | 9/1970 | France . |
| 0059130 | 2/1982 | France . |
| 0108020A1 | 10/1983 | France . |
| 929689 | 6/1963 | United Kingdom . |
| 1098599 | 1/1968 | United Kingdom . |
| 1335438 | 10/1973 | United Kingdom . |

Primary Examiner—Herbert B. Guynn
Assistant Examiner—John S. Maples

[57] ABSTRACT

A radial neutron reflector is disclosed for a light water nuclear reactor. The irregular space between the core periphery and the core barrel surrounding the core is filled with a structure comprising material other than hydrogen such as zirconia or stainless steel so as to displace the reactor water coolant in this region. The structure is provided with appropriately sized flow holes to pass reactor coolant therethrough and to balance the pressure within the structure to substantially coincide with the axial pressure profile at the core periphery.

2 Claims, 5 Drawing Sheets

RADIAL NEUTRON REFLECTOR

This application is a continuation of application Ser. No. 576,655, filed Feb. 3, 1984, now abandoned.

BACKGROUND OF THE INVENTION

1. Field of the Invention

This invention relates in general to the field of pressurized light water nuclear reactors and in particular to the radial neutron reflector surrounding the nuclear core for improved neutron economy to lower fuel costs.

2. Description of the Prior Art

It is well known that commercial pressurized light water nuclear reactors are both a technical and commercial success. In such reactors, a reactive region commonly referred to as a nuclear core contains fissile fuel such as uranium 235 or plutonium 239 in which sustained fission reactions occur to generate heat. A group of mechanical components which are known as reactor internals structurally support the core within a hermetically sealed pressure vessel. The reactor internals also direct the flow of a cooling medium such as light water through the nuclear core, and out of the pressure vessel. The cooling medium which is alternatively called the reactor coolant removes the heat generated by the nuclear core and transfers the heat to another cooling medium within heat exchangers which are located external of the pressure vessel. The second cooling medium is usually water which is converted into steam in the heat exchangers and is used to produce electricity by conventional steam turbine-electrical generator combinations.

In general, in such reactors, the nuclear core is comprised of a plurality of elongated fuel assemblies having a substantially square cross section. The reactor internals usually comprise an upper core support plate, a lower core support plate and a core barrel. The upper core support plate is supported by a flange within the pressure vessel. The lower core support plate is attached to the core barrel, at its lower end. The upper portion of the core barrel is also supported by a flange within the pressure vessel. The core barrel comprises an elongated cylinder interposed between the nuclear core and the cylindrical wall of the pressure vessel. The nuclear core is positioned within the core barrel and between the upper and lower core support plates. Typically, the reactor coolant enters the pressure vessel through one or more inlet nozzles, flows downward between the pressure vessel and the outside of the core barrel, turns 180°, and flows upward through the lower core support plate and through the core. The heated reactor coolant then turns 90° and exits the pressure vessel through one or more exit nozzles and then to the heat exchangers previously mentioned.

In any reactor, such as the one described, the fission rate of the nuclear fuel or the number of neutrons produced by the fission process must remain constant. It is well known that each neutron producing a fission causes heat and the production of more than one other neutron. To sustain the nuclear chain reaction, at least one of the newly produced neutrons must then fission another atom of fuel. The reactor coolant comprising light water is an excellent moderator of neutrons; hence, it is the primary means by which the fast neutrons produced by the fission process are thermalized or slowed down so that another fission may occur and thereby sustain the chain reaction. The excess neutrons are accounted for in a number of different ways. Some are slowed down and absorbed by a nuclear poison such as boron which is dissolved in the primary coolant. Others are absorbed by axially movable control rods which are interpersed throughout the nuclear core and made of materials specifically selected to absorb neutrons. Control rods are well known in the prior art and comprise the primary means to control the operating power level of the nuclear reactor. Still other neutrons are absorbed by poisons which buildup within the nuclear fuel and are caused by the fission process itself.

In order to extend the life of the nuclear core as long as is practical so as to minimize time consuming reactor shutdowns for refueling purposes, the fuel assemblies are provided with enriched nuclear fuel, usually enriched uranium 235. This excessive amount of reactivity is designed into the core at startup so that as the reactivity is depleted over the life of the core, the excess reactivity may then be used to extend the life of the core. The amount of enrichment continuously decreases as the reactor operates until such time as the fuel can no longer sustain the chain reaction. Then the reactor must be shut down and refueled. During the initial stages of reactor operation or during the phase which is known as beginning of life, special neutron absorbing control rods are inserted within the core and/or additional soluble poisons are dissolved within the reactor coolant to absorb the excess reactivity. As the excess reactivity decreases, the amount of insertion of the special control rods and/or the amount of soluble poison is decreased to allow use of the excess reactivity. In this manner, the excess reactivity is held in abeyance until it is needed.

Enriched uranium is extremely expensive. It is preferable therefore to reduce the amount of enrichment whenever possible but without reducing the extended length of the life of the core. One recognized method of theory to accomplish this result is by making more efficient use of the neutrons produced by the fission process. An area where present day nuclear reactors are relatively inefficient as regards neutron economy is concerned is the region of the reactor between the internal diameter of the pressure vessel and the core and in particular between the internal diameter of the core barrel and the outer periphery of the fuel assemblies. Since the fuel assemblies are square in cross section, side-by-side stacking of the fuel assemblies produces an irregular noncircular outer periphery of the core. Typically, stainless steel vertical plates are positioned against the irregular periphery of the core. The vertical plates are supported by a plurality of horizontal "former plates" bolted to the vertical reflector plates. The former plates are in turn bolted to the core barrel.

The former plates are specially shaped to provide for the transition from the irregular core periphery to the circular shape of the core barrel. The vertical plates provide for core lateral support and prevent the reactor coolant from bypassing the core. Although not originally intended, it has been determined that the vertical stainless steel plates also provide a radial neutron reflection function. In this manner, means have been provided whereby some of the excess neutrons produced by the fission process and which radially escape from the core are reflected by the stainless steel plates back into the core. Unfortunately, the present day design of the stainless steel plates as regards the radial reflector function is not as efficient as desired. For example, the space between the vertical stainless steel and the horizontal former plates is occupied by primary coolant which allows for removal of the heat absorbed by the core barrel, the former plates and the vertical plates. While water is an excellent moderator it is an inefficient reflector. Thus, while some neutrons are reflected back into the core, a great number are thermalized and/or absorbed by the relatively large volume of reactor coolant located radially external of the nuclear core.

Accordingly, a primary object of the present invention is to provide apparatus surrounding the irregular shape of the nuclear core which provides for core lateral support, prevents the reactor coolant from bypassing the core and which reduces the net amount of neutron leakage from the core by reflecting neutrons which would otherwise escape, back into the core for improved neutron economy.

Another primary object of the present invention is to provide an efficient neutron reflector at the core periphery so as to decrease the amount of fuel enrichment which would otherwise be required to achieve the same length of core life.

Another primary object of the present invention is to provide an efficient neutron reflector at the core periphery so as to increase the flux level at the core periphery and thereby flatten the power distribution across the core.

Other objects although not listed are intended to be within the scope of the present invention. Thus, the above stated objects are not intended to be a complete listing of all the objects of the present invention.

SUMMARY OF THE INVENTION

The above objects as well as others are achieved by the present invention which provides a highly efficient neutron reflector assembly between the core periphery and the core barrel.

In one embodiment of the present invention, the space between the core periphery and the core barrel is divided into a plurality of different shapes for each one-quarter of the cross section of the core. Each quarter of the core contains the same plurality of shapes. Each of the different shapes comprise a removable reflector assembly comprising a stainless steel can containing a plurality of zirconia rods circular in cross section which are clad with a zircalloy shell and a plurality of noncircular zircalloy rods. The noncircular rods are used to fill the space at the edges of the can where there is not room for a completely round rod. The stainless steel can includes a nozzle at each end for flow purposes, positioning and/or alignment purposes, structural purposes, assembly purposes, removal purposes, etc. Spaced horizontal plates within the can, through which the zirconia rods pass, provide for control of coolant flow through each of the assemblies, support the zirconia rods, and for matching the axial pressure distribution inside each of the reflector assemblies with that of the core.

In another embodiment, the plurality of different shapes surrounding the core are provided with removable reflector assemblies comprising blocks of zirconia stacked upon each other and clad in a zircalloy can. Zircalloy tubes pass through the length of each of the assemblies for cooling. Nozzles are again provided at each end of each assembly.

In yet another embodiment, the reflector comprises plates of stainless steel which substantially occupy the space between the irregular core periphery and the circular core barrel. The plates are stacked upon each other to achieve a height substantially equivalent to the height of the core. The plates may be held in place by vertical keys attached to the inner diameter of the core barrel. Coolant flow holes are provided in the plates to allow for cooling and to minimize thermal distortion.

It is to be noted that the key to the effectiveness of the above embodiments is the removal of water from the reflector region and replacing the water by a structure other than hydrogen.

Various other objects, advantages and features of the invention will become apparent to those skilled in the art from the following discussion taken in conjunction with the following drawings, in which:

DESCRIPTION OF THE PREFERRED EMBODIMENTS

Figure 1:
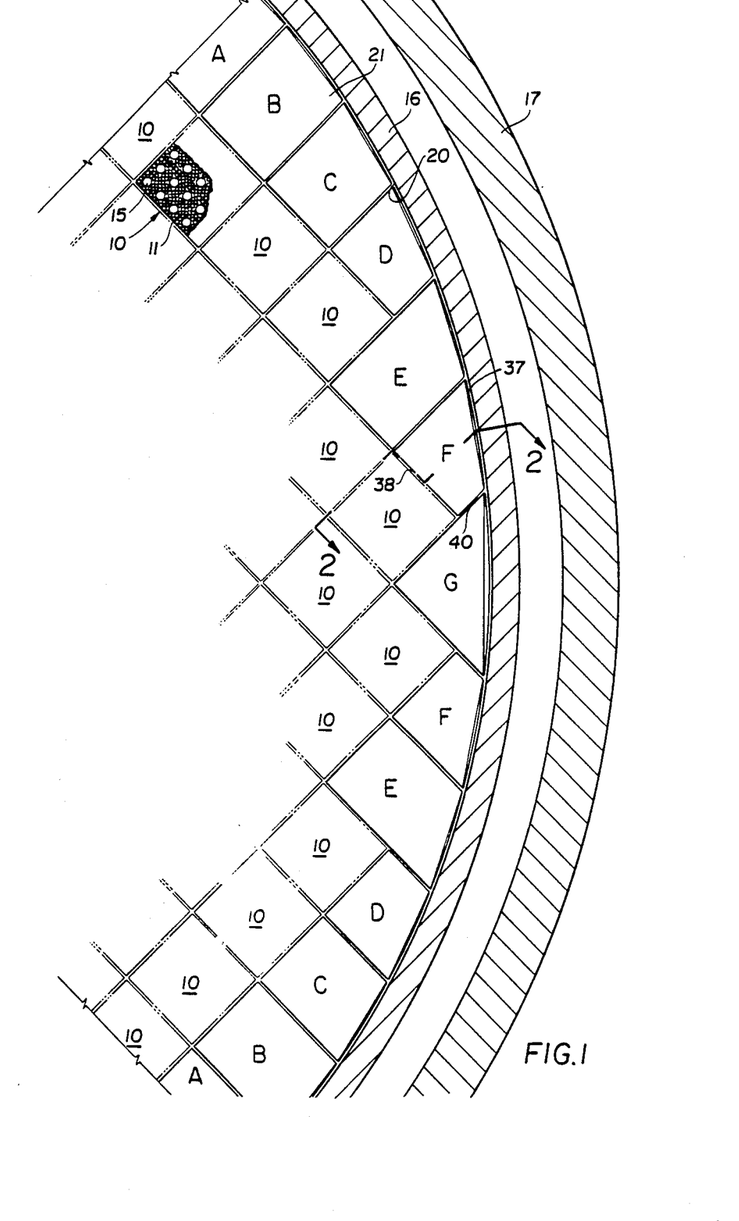
FIG. 1 is a partial plan view of one-quarter of a nuclear core illustrating the neutron reflector region to which the present invention is applicable.

Referring now to the drawings, specifically FIG. 1 which depicts a quarter section of a nuclear core. It is, of course, to be understood that the three one-quarter portions of the core not shown in FIG. 1 each comprise the same configuration as that shown in FIG. 1 and thereby form a full core cross section. In the example used, the nuclear core comprises 193 individual fuel assemblies 10 having a substantially square cross section which permits side-by-side stacking, one against each other. Also, only those fuel assemblies 10 which form the core periphery are shown in FIG. 1; therefore, it is to be further understood that similar fuel assemblies are located inboard of those which are shown. It is to be even further understood that the present invention is applicable to cores having any number of fuel assemblies and any irregular periphery, not merely the example shown and described.

Figure 2:
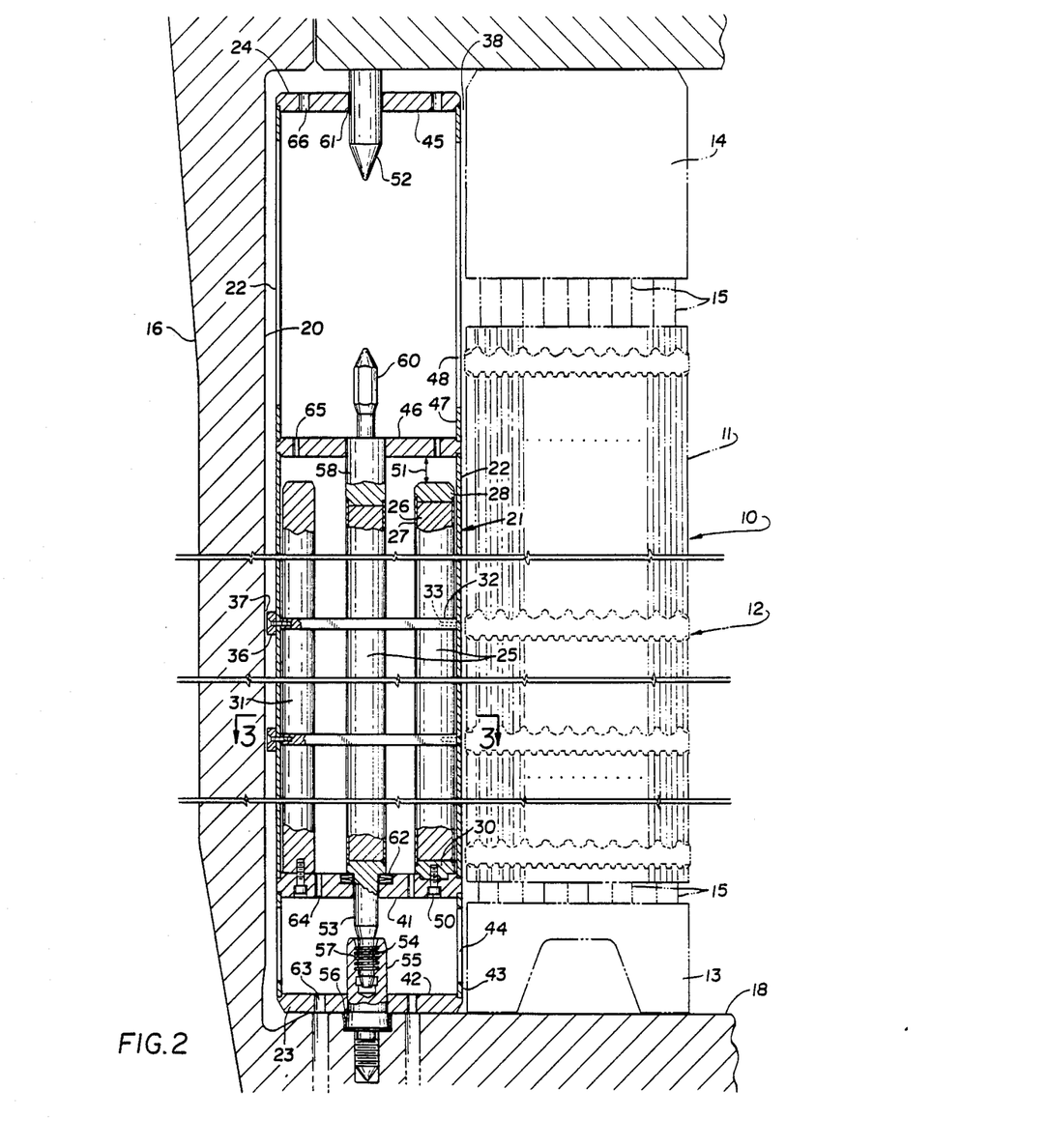
FIG. 2 is a partial cross-sectional view of the portion of the core and reflector region taken along the line 2—2 of FIG. 1, illustrating the use of zirconia rods as reflector elements.

Each fuel assembly 10 may comprise an array of elongated fuel rods 11 held in spaced relationship to each other by a plurality of grids 12 spaced from each other along the fuel assembly 10 length as shown in FIGS. 1 and 2. Each fuel rod 11 comprises a tube filled with nuclear fuel pellets; the ends of the tubes are sealed for containment purposes. A coolant flow inlet nozzle 13 and a coolant flow outlet nozzle 14 are provided at the fluid inlet and outlet ends, respectively, of the fuel assembly 10. Guide thimbles 15 comprising hollow tubes are located at predetermined positions in each fuel assembly 10 for insertion of control rod cluster assemblies to control the fission process, for insertion of reactor shut-down rod cluster assemblies as well as for insertion of rod cluster assemblies to control the excess reactivity designed into the fuel assemblies 10, none of which are shown. The design of the fuel assemblies 10 is well known in the art.

A core barrel 16 which typically comprises a stainless steel cylindrical support member surrounds the nuclear core. The core barrel 16 includes a flange (not shown) by which the core barrel 16 is structurally supported within the pressure vessel 17, a portion of the latter being shown in FIG. 2. A lower core support plate 18 is welded to the lower portion of core barrel 16. The nuclear core rests upon and is supported by the lower core support plate 18. An additional function of the core barrel 16 is to provide a reactor coolant flow separation barrier whereby the reactor coolant inlet flow within the pressure vessel 17 is external of core barrel 16 and the core coolant flow is internal of the core barrel 16. The configuration and function of the core barrel is also well known in the art.

The space between the internal diameter 20 of the core barrel 16 and the irregular periphery of the peripheral fuel assemblies 10 is known as the core reflector region. Due to the nature of the core periphery, the reflector region also comprises an irregular shape. The reflector region may be divided into seven basic shapes A, B, C, D, E, F and G as shown in FIG. 1. There are a total of four each of shapes A and G and eight each of shapes B, C, D, E and F around the entire core periphery. Shapes other than those shown in FIG. 1 may also be used.

Figure 3:
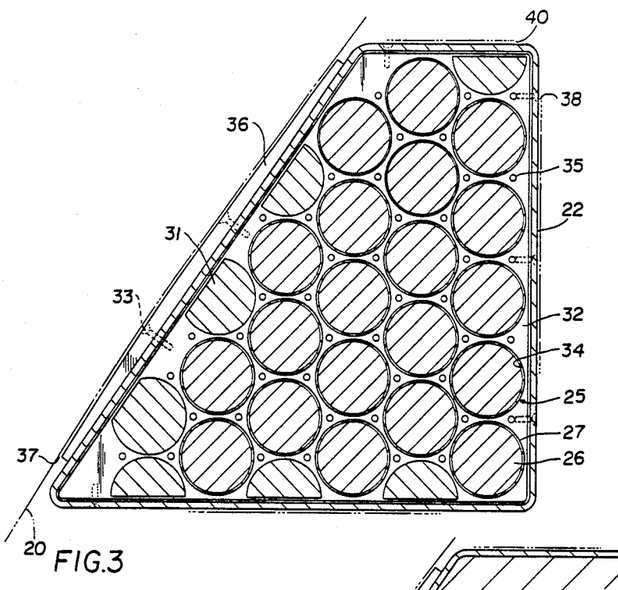
FIG. 3 is a cross-sectional plan view of the embodiment of FIG. 2 taken along the line 3—3 of FIG. 2.

FIGS. 2 and 3 illustrate the details of a typical reflector assembly 21 located at position F. A stainless steel can or enclosure 22 completely encompasses reflector assembly 21. A stainless steel inlet 23 and outlet 24 nozzle is provided at the reflector assembly inlet and outlet ends respectively. An array of parallel arranged reflector rods 25 comprising zirconia pellets 26 stacked one on top of each other within a zircalloy cladding tube 27 are provided within can 22. End plugs 28 and 30 appropriately secured such as by seal welding to tube 27 maintain the integrity of pellets 26 in reflector rod 25 and prevent the pellets 26 from being exposed to reactor coolant. At the edges of can 22, where there is not sufficient space for a completely round rod; solid zircalloy full length, partially round rods 21 are used. The zirconia pellet 26 stacked length in reflector rods 25 is consistent with and substantially equal to the active fuel length of the nuclear core to assure radial reflection of the neutrons. The operating pressure and temperature and the neutron flux at the reflector region will cause the reflector rod cladding 27 to collapse against the zirconia pellets 26 during reactor operation to further assure the integrity of the reflector rods 25. In this regard, the outer diameter of the pellets 26 may fit closely at assembly within the inner diameter of the zircalloy cladding 27. Zirconia has a high compressive strength and can thus support the cladding 27 both radially and axially. Additionally, since the thermal coefficient of expansion of zirconia is similar to zircalloy, stresses induced by thermal cycling will be low. The reflector rods 25 and the partially round solid rods 31 may be radially spaced and supported by a plurality of axially spaced stainless steel plates 32. plates 32 may be provided at core elevations which coincide with the locations of the fuel assembly grids 12. Plates 32 may be sized to closely fit within can 22. Plates 32 may be attached to can 22 by screws 33. It is to be noted that FIG. 2 shows only one typical reflector rod 25, one central reflector rod 25 and one typical partially round reflector rod 31 for purposes of clarity. There are of course a number of reflector rods 25 and partially round reflector rods 31 as shown more accurately in FIG. 3.

Clearance holes 34 in plates 32 are provided to allow reflector rods 25 and the partially round rods 31 to pass therethrough and be laterally supported by plates 32. In this regard, clearance holes 34 are sized to closely fit the outer diameter of the reflector rods 25 and partially round rods 31. Flow holes 35 are also provided in plates 32 to provide coolant flow, which is reactor by-pass flow through the reflector assemblies 21. Flow holes 35 are sized to control the coolant flow and to match the axial pressure distribution within reflector assembly 21 with that of the nuclear core. This minimizes the pressure loading on the can 22.

Spacers 36 are provided between the inner diameter 20 or core barrel 16 at the axial location of plate 32 to fill the gap between the curved inner surface of the core barrel 16 and the straight surface of can 22. Spacers 36 control coolant flow and transmit lateral seismic loads from the fuel assemblies 10 to the core barrel 16. A clearance space 37 is provided between the spacers 36 and the inner diameter 20 of core barrel 16. Clearances 38 and 40 are also provided between adjacent reflector assemblies 21 and the fuel assemblies 10 to allow heat removal from the reflector assemblies 21 and the core barrel 16. Thermal bowing of the reflector assemblies 21 is controlled by appropriately sizing clearances 37, 38 and 40 and flow holes 35 to provide greater flow rates and/or flow velocities to increase the transfer of heat from sections of the reflector assemblies 21 where heat generation is high.

The reflector assembly stainless steel inlet nozzle 23 comprises an upper 41 and a lower 42 plate spaced apart from each other by inlet nozzle can 43 appropriately joined together such as by welding. Upper plate 41 is appropriately joined to stainless steel can 22 such as by welding. A plurality of windows 44 are provided in lower plate 42 and upper plate 41 to allow coolant to flow through reflector assembly 21. Similarly, reflector assembly outlet nozzle 24 comprises an upper plate 45, a lower plate 46 and an outlet nozzle can 47 also having windows 48 therethrough which components are appropriately connected such as by welding to each other and to stainless steel can 22. Each of the individual reflector rods 25 and 31 except for the centermost rod 25 are connected to the upper plate 41 of the reflector inlet nozzle 23 such as by screws 50. Clearance space 51 is provided between the top of each reflector rod 24 and 31 and the lower plate 46 of the reflector assembly outlet nozzle 24 for thermal expansion and radiation creep. Each reflector assembly 21 is radially aligned within the nuclear core by guide pins 52 which may fit within guide pin hole 61 provided in the upper plate 45 of the outlet nozzle 24 of the reflector assemblies 21 much in the same manner as fuel assemblies 10 are aligned and are well known in the art.

Each reflector assembly 21 is connected to the lower core support plate 18 as shown in FIG. 2. The centermost reflector rod 25 is provided with an elongated lower plug 53, the bottom end of which is threaded 54. Elongated lower plug 53 extends through the upper plate 41 of the reflector assembly inlet nozzle 23. A mechanical connector 55 is threaded into and swage locked in position by a locking ring 56. The external thread 54 on the bottom end of elongated lower plug 53 is threaded into the internal threads 57 in connector 55. The upper end of the centermost reflector rod 25 is also provided with an elongated upper plug 58 which has torque transmitting means thereon such as a hexagonally shaped rod 60. By using an appropriate conventional tool lowered through guide pin hole 61 in outlet nozzle upper plate 45, and onto hexagonally shaped rod 60, the centermost rod 25 may be rotated and tightened to connector 55. In this manner, reflector assembly 21 may be secured to the lower core support plate 18. Any loosening effect upon the reflector assembly 21 holddown force due to reactor operation is compensated for by the Bellville springs 62.

Figure 4:
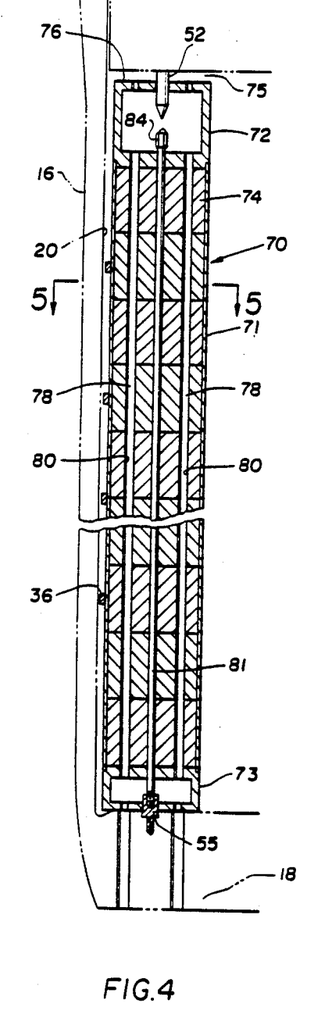
FIG. 4 is a partial cross-sectional view of the portion of the core and reflector region taken along the line 2—2 of FIG. 1 illustrating the use of zirconia blocks as reflector elements.
Figure 5:
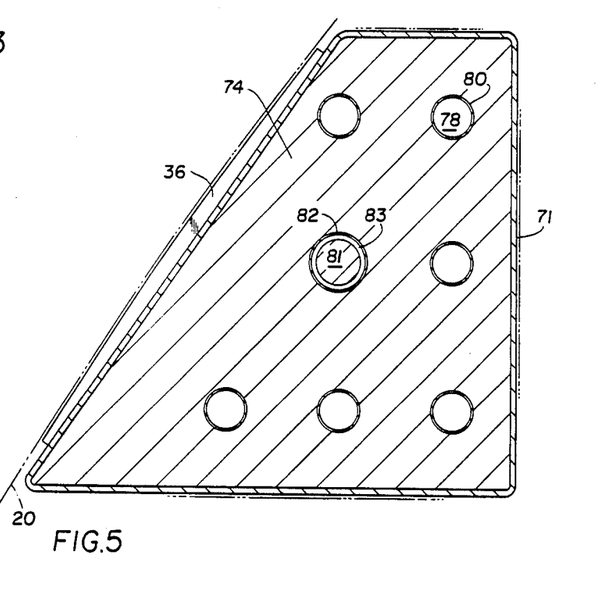
FIG. 5 is a cross-sectional plan view of the embodiment of FIG. 4 taken along the line 5—5 of FIG. 4.

FIGS. 4 and 5 illustrate a second embodiment of the present invention. In this embodiment, the reflector assembly 70 is also described with regard to position F of the reflector region. A zircalloy can 71 is connected such as by welding to a zircalloy upper outlet nozzle 72 and to a zircalloy lower inlet nozzle 73. Can 71, however, is filled with blocks 74 of zirconia which are stacked one upon each other and completely fill the length of the can 71. A zircalloy can 71 can be used in this embodiment because of the inherent structural stability of the stacked zirconia blocks. Clearance 75 between the upper plate 76 of outlet nozzle 72 and the upper support plate 77 allows for thermal expansion and radiation creep of the reflector assembly 70.

The cross-sectional shape of the zirconia blocks 74 is shown in FIG. 5 and, at assembly, are slightly smaller than the interior cross-sectional shape of can 71. During reactor operation, the system pressure and temperature plus the radiation cause the relatively thin zircalloy cladding 71 to collapse against the zirconia blocks 74. Cooling holes 78 axially aligned with each other in each of the zirconia blocks 74 are provided with zircalloy cooling tubes 80. The outer diameter of tubes 80 are seal welded at one end to the inlet nozzle 73 and at the other end to the outlet nozzle 72. Reactor coolant flows through cooling tubes 80 to control the temperature distribution across the cross section of the zirconia blocks 74. Heat generation in the zirconia blocks 74, due to core radiation, is maximum at locations closest to the core and then decays quickly at locations away from the core. Hence, more cooling holes 80 and/or coolant flow is required closer to the core to prevent thermal bowing of the reflector assembly.

The zircalloy cooling tubes 78 on the inside of holes 78, due primarily to the system pressure, expand against the diameter of holes 78 until they are supported by the zirconia blocks 74.

The reflector assembly 70 is connected to the lower core support plate 18 by threaded connection 55 in the same manner as the previous embodiment. In this embodiment, however, a stainless steel tie rod 81 is fitted within a zircalloy tube 82 provided within a centrally located cooling hole 83 in zirconia blocks 74. A hexagonally-shaped surface integral with the upper end of tie rod 81 allows torquing of tie rod 81 and tightening of reflector assembly 70 to connector 55. Zircalloy tube 82 is also sealingly connected to inlet 73 and outlet 72 nozzles.

In the manner described, the zirconia blocks 74 are sealingly encapsulated within inlet nozzle 73, outlet nozzle 72, zircalloy can 71 and zircalloy tubes 80 and 82 such that they are prevented from being exposed to reactor coolant.

Figure 6:
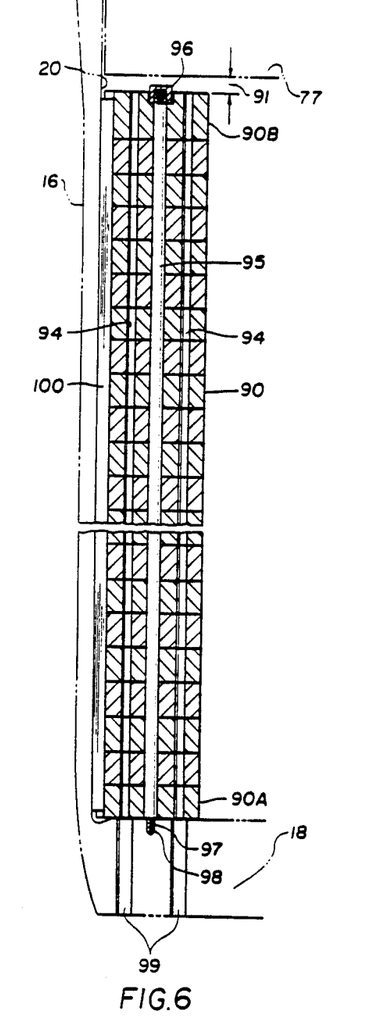
FIG. 6 is a partial cross-sectional view of the portion of the core and the reflector region taken along the line 2—2 of FIG. 1 illustrating the use of stainless steel plates as reflector elements; and, FIG. 7 is a full cross-sectional view of the embodiment of FIG. 6 taken along a typical axial line across the core.
Figure 7:
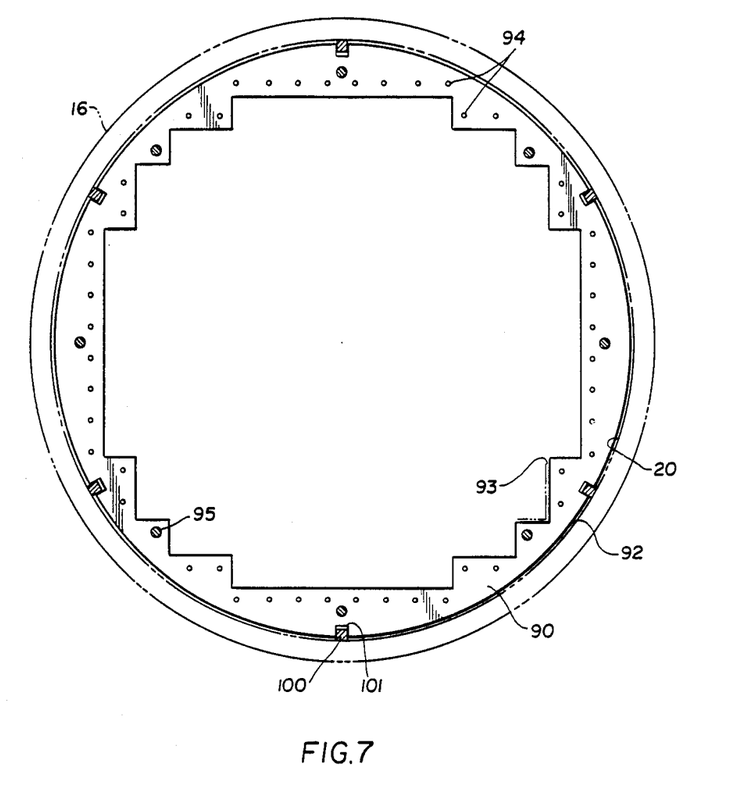

FIGS. 6 and 7 illustrate a third embodiment of the present invention. In this embodiment, the reflector region is filled with stacked stainless steel plates. Each plate 90 may comprise a one-piece structure having a predetermined thickness with a circular outer configuration and an inner configuration substantially coinciding with the outer periphery of the nuclear core. In this manner, each plate 90 may be placed between the core barrel inner diameter 20 and the irregular core periphery. The stacked plates 90 will therefore fill the reflector region between the lower core support plate 18 and the upper core support plate 77 to fully span the active core length. The lowermost plate 90A in this embodiment rests on the lower core support plate 18. A clearance 91 is provided between the uppermost plate 90B and the upper core support plate 77 to allow for axial thermal expansion. The size of clearance 91 is relatively unimportant inasmuch as the uppermost plate 90B is well above the height of the active core length; and, since the plates 90 are made from stainless steel, there is a relatively minor difference between the relative thermal expansion between the upper 77 and lower 18 core support plates and the stacked length of plates 90.

A radial clearance 92 is provided between the outer perimeter of plates 90 and the core barrel inner diameter 20. Additional radial clearance 93 is provided between the out perimeter of the core and the inner perimeter of the plates 90. A plurality of axially aligned coolant flow holes 94 are also provided in each of the plates 90. Flow holes 94 are aligned with flow holes 99 in the lower core support plate 18 as in each of the previous embodiments to assure coolant flow through the reflector plates 90. Coolant passages 92, 93 and 94 assure adequate cooling of the reflector plates 90 as well as minimize thermal distortion.

A plurality of tie rods 95 which may, for example, be spaced every 45° around the reflector plates 90, may be utilized to fasten the stacked reflector plates 90 to the lower core support plate. Each tie rod 95 may comprise an elongated stainless steel rod having a hexagonally-shaped head 96 at one end and external threads 97 at the other end, similar to an elongated bolt. The lower surface of head 96 bears against an upper surface of the uppermost reflector plate 90B while the threaded end 97 is threadingly fitted to threaded holes 98 in the lower core support plate 18, all in a conventional manner. Torquing the head 96 tightens the stacked reflector plates 90 against the lower core support plate 18.

A plurality of vertical keys 100 having a substantially rectangular cross section are each welded to the core barrel 16 at appropriate locations around the inner diameter 20 of the core barrel 16. Keys 100 fit within corresponding cutouts 101 provided in the outer periphery of the reflector plates 90. Keys 100 and cutouts 101 in combination allow vertical and radial thermal expansion of the reflector plates 90 without permitting positional displacement. Keys 100 also provide lateral support against seismic loads.

It is to be noted that the above embodiments depict and describe various ways to eliminate water and therefore hydrogen from between the irregular core periphery and the pressure vessel by providing a substantially solid structure between the core periphery and the core barrel. Hydrogen as previously stated is a very inefficient reflector of fast leakage neutrons. Materials other than hydrogen, on the other hand, are quite effective as reflectors. Hence, while the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. In a nuclear reactor using light water as a reactor coolant, comprising a nuclear core, a core barrel surrounding the nuclear core, and a radial space between said core barrel and said core, said reactor coolant flowing in said radial space and comprising core bypass coolant flow, neutron reflector means comprising a substantially non-hydrogen containing material fitted within said radial space for substantially displacing said reactor coolant in said radial space, said neutron reflector means comprising a plurality of elongated metal sealed cans arranged side by side, said cans each having a plurality of elongated metal rods contained therein, a flow inlet nozzle connected to one end of each of said cans and a flow outlet nozzle connected to the other end of each of said cans and one or more plates attached to and fitted within said cans in a direction at right angles to said rods, said rods passing through said one or more plates, said nozzles and said one or more plates having flow openings therethrough for passage of reactor coolant flow through said cans to regulate the axial pressure distribution within said cans, and clearance spaces between adjacent cans, between said cans and said core barrel and between said cans and said fuel assemblies for selectively regulating core bypass flow up and around said cans whereby said core barrel and said cans are cooled, respectively, to prevent excess thermal bowing of said cans to remove heat from locations of high heat generation from said cans and said core barrel.

2. The apparatus of claim 1, wherein said metal cans have one or more spacers fitted outside thereof between said can and said core barrel at the axial location of said one or more plates whereby the coolant flow between said core barrel and said cans is controlled.

* * * * *